Nov. 6, 1928.   G. R. VANDER WEE   1,690,803
SAW
Filed May 10, 1923

Inventor
George R. Vander Wee,
By
Attorneys

Patented Nov. 6, 1928.

1,690,803

UNITED STATES PATENT OFFICE.

GEORGE R. VANDER WEE, OF DETROIT, MICHIGAN.

SAW.

Application filed May 10, 1923. Serial No. 637,957.

In the manufacture of saws, a blank of suitable and uniform thickness is usually formed with cutting teeth by removing or blanking out laterally, portions of the metal, or as in the process disclosed in my Patent No. 1,371,008, of March 8, 1921, the teeth are formed on the edge of the blank by displacement of portions of the metal, but in all of these known methods the teeth are of the same thickness as the body of the blank, and tooth clearance is secured by projecting the tooth points laterally, either through the common method of "setting" or alternate bending of the teeth laterally, or as in my previous process, by causing the metal at the cutting points of the teeth to flow laterally.

When tooth clearance is secured by laterally projecting the tooth points, these points soon wear away and proper clearance is lost. Further, these laterally projecting points do not give a clean cut along the side walls of the kerf, but in a measure tear away the material to give clearance, causing a "drag" and increasing the power required to operate the saw. Further, in the usual process of manufacturing, a burr is often formed along the tooth edge and if this burr is not removed by a necessarily separate operation, it will interfere with the efficient operation of the saw, often causing it to "run" or deflect from a straight line in cutting.

The object of the present process or method is to produce a finished saw with a minimum number of operations, and to form by a single simple operation, side teeth to cut along the plane of the side walls of the kerf and provide tooth clearance.

A further object of the present invention is to provide an easy running saw and one having increased tooth strength to withstand heavy strains and prevent tooth breakage.

It is also an object to provide a saw formed to cut in the plane of the side walls of the kerf to give tooth clearance and to cut the full width of the kerf along the main cutting edges or points of the teeth, and put an even strain on said points, giving a smooth even cut at the bottom of the kerf.

Another object of the present invention is to provide certain other new and useful features in the construction of saws, all as will hereinafter more fully appear.

With the above and other ends in view, the invention consists in the several matters relating to the form and construction of saws, all as hereinafter more fully set forth, reference being had to the accompanying drawings, in which—

Figure 1:
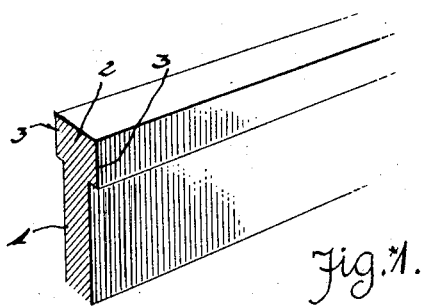
Figure 1 is an enlarged perspective view illustrative of a portion of a suitable form of blank for use in the manufacture of saws embodying the invention.
Figure 2:
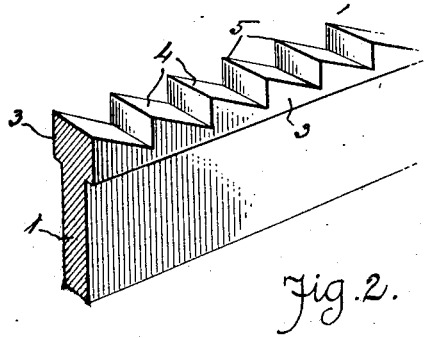
Fig. 2 is a similar view of a portion of a blank with cutting teeth formed thereon.
Figure 3:
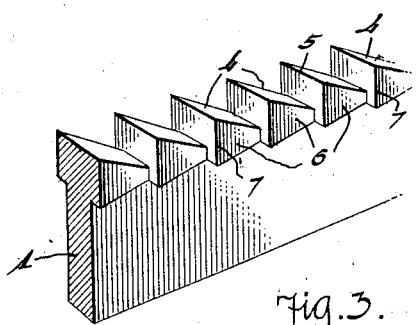
Fig. 3 is a similar view of a portion of the finished saw, said Figs. 1, 2 and 3 being illustrative of the stages of manufacture.

In order to provide the desired tooth rigidity and strength, the saw blank 1 is preferably formed with an edge portion 2 which is of greater thickness transversely of the blank, than the body of the blank, thus providing flanges or ribs 3 extending laterally from each side face of the blank along its edge, and these flanges are preferably of a depth or width inwardly from the blank edge, equal to or greater than the depth of the main cutting teeth 4 which are formed in the edge of the blank, and said flanges also preferably project laterally from the blank a distance equal to the desired tooth clearance to be given the teeth or the distance which, in a saw of the usual construction, the points of the teeth extend laterally and known as the "set" of the teeth, so that they will cut a kerf wider than the thickness of the saw body to provide clearance for the chips or material removed by the teeth in cutting.

By forming the main cutting teeth 4 in the edge of this thickened portion of the blank, transversely of said edge, said teeth will be of greater thickness than the body of the blanks, and will therefore have greater rigidity and strength than teeth of the same thickness as the blank, and the point or cutting edge 5 of each tooth will cut the full width of the kerf, giving straight even cutting edges extending at right angles to the line of travel of the teeth, and giving a smooth even cut at the bottom of the kerf which will tend to eliminate "running" or lateral deflection of the saw in cutting along a straight line.

However in order to give proper clearance between the laterally projecting end portions of the teeth 4 thus formed in the thickened edge portion of the blank, and the side walls of the kerf, side or clearance teeth 6 are formed in the laterally projecting or flange portions 3 of the thickened edge portion of the blank, said teeth being preferably of a depth equal to the distance which said flanges project beyond the side faces of the body of the blank, the projecting edges 7 of these clearance teeth being at right angles to the cutting edges 5 of the main teeth 4, and in the plane of said cutting edges 5, thus forming a continuous cutting edge extending across the edge of the blank for the full width of the kerf and thence downwardly or inwardly at each side of the blank from each end of the main cutting edge. The notches formed between the clearance teeth by the removal of portions of the metal forming the laterally extending flanges 3, extend inwardly with their inner angles preferably in the planes of the side faces of the body of the blank, and thus side cutting teeth are provided to cooperate with the main cutting teeth in cutting the kerf in the operation of the saw, these side or clearance teeth cutting at right angles to the main cutting teeth which cut at the bottom of the kerf and thus said teeth cut along and form the side walls of the kerf, the side notches between these side teeth affording clearance for the chips or material removed by both the main and clearance teeth.

The forward or right angle side of each saw tooth in this construction is therefore of greater width transversely of the saw, than the thickness of the body of the saw, and each tooth tapers rearwardly in the direction of cutting movement at the sides of the saw as well as at the edge thereof. Very strong and rigid teeth are thus formed which teeth have straight cutting points 5 which cut the full width of the kerf, thus giving a smooth even cutting action at the bottom of the kerf, and the side or clearance teeth not only provide clearance, but also cut smoothly and evenly laterally of the saw to form the side walls of the kerf. These cutting edges being symmetrically arranged, put an even strain upon the teeth and give a balanced effect, eliminating all tendency of the saw to deflect from a straight line in cutting, and giving a smooth even running saw which requires much less power to operate it than is required to operate a saw of the usual construction. Further, the side or clearance teeth, by cutting along the side walls of the kerf, as distinguished from the tearing or breaking away action of the lateral or clearance tooth points of a saw of common construction, give a clean even cut along the side walls and thus eliminate the drag caused by this tearing action of the tooth points in common constructions.

Figure 4:
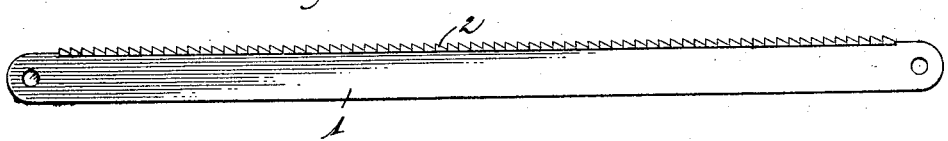
Fig. 4 is a side elevation of one form of saw embodying the invention.

As an example of one form of saw which may be advantageously produced by the present method and which will have many advantages over saws for the same purpose as commonly formed, a metal cutting or hack saw is shown in Fig. 4. Hack saws are usually formed with comparatively fine or small teeth by simply blanking out these teeth laterally from the edge of a blank of uniform thickness. Such saws have no set, as the teeth are too small to be bent laterally, and if formed with laterally projected tooth points to give clearance, these points are so frail that they are rapidly destroyed under the severe strain of cutting metal. Further such blanking process leaves a burr along one edge of the tooth, which burr will interfere with the efficient operation of the saw, but such saws may be produced by the present method almost as rapidly and cheaply as by the old methods and the small teeth produced by this method will have better wearing qualities and any burr formed during the production of the same will be removed, and the saw will operate more efficiently due to tooth clearance and side cutting edges.

Any desired method may be employed in forming the main cutting teeth on the edge of a blank, such teeth being formed by a removal of portions of the metal between the teeth or by a displacement of such metal, and the size and relative proportions of the teeth and their arrangement may be varied within the scope of the appended claims, and any suitable means may be provided for carrying out the several steps of the process of manufacture, either in the manufacture of straight or of circular saws.

Having thus fully described my invention, what I claim is:—

1. A saw formed from a blank having a thickened edge portion providing laterally extending ribs at each side of the blank along the edge thereof, edge cutting teeth formed in said thickened edge transversely thereof, each tooth having a cutting edge extending the full width of said thickened edge, and side clearance teeth formed in said laterally extending ribs with cutting edges extending inwardly of the blank across said ribs and forming a continuation of the cutting edges of the transverse teeth at each end thereof, said transverse teeth being inclined rearwardly in the direction of cutting movement of the saw, from said cutting edges, the faces of each lateral tooth converging rearwardly in the direction of cutting movement.

2. A saw formed from a blank having a thickened edge portion providing laterally extending ribs at each side of the blank along the edge thereof, edge cutting teeth formed in said thickened edge transversely thereof, each tooth having edge and side cutting edges extending the full width of said thickened edge, the edge face of each tooth being inclined rearwardly in the direction of cutting movement, from its edge cutting edge, with its side faces converging rearwardly in said direction from each side cutting edge inwardly to the planes of the side surfaces of the body.

In testimony whereof I affix my signature.

GEORGE R. VANDER WEE.